United States Patent Office 3,232,844

Patented Feb. 1, 1966

3,232,844

METHOD FOR MANUFACTURING INOSINIC ACID BY FERMENTATION

Shukuo Kinoshita, Tokyo, Kiyoshi Nakayama, Sagamihara-shi, and Takeo Suzuki and Zenroku Sato, Tokyo, Japan, assignors to Kyowa Hakko Kogyo Co., Ltd., Tokyo, Japan, a corporation of Japan No Drawing. Filed Apr. 30, 1963, Ser. No. 276,995
Claims priority, application Japan, Nov. 11, 1960, 35/44,406
9 Claims. (Cl. 195—28)

This application is a continuation-in-part of our copending application Serial No. 128,697, filed August 2, 1961, now abandoned, and entitled: A method for manufacturing inosinic acid by fermentation.

The present invention is concerned with a method for manufacturing seasoning which contains inosinic acid salt or the same as an essential ingredient which is characterized in that an adenine-requiring mutant of *Micrococcus glutamicus* is cultured in a culture medium containing a proper amount of carbon source such as saccharide and the like, nitrogen source, inorganic material, and other nutrients which are required for the growth of the microorganism to produce and accumulate directly inosinic acid (inosine-5′-phosphate) therein, its Na-salt having a powerful seasoning action, and the latter is separated and recovered therefrom.

Such a mutant strain of *Micrococcus glutamicus* can be easily obtained for the skillful in the art, according to the knowledge of recent microbial genetics, by subjecting microorganism to various mutagenic treatments, i.e. the irradiation with ultra-violet ray, X-ray, $\gamma$-ray and chemicals treatments. For instance, there is the Davis' method which is described in Jour. of American Chemical Society, vol. 70, page 4267, 1948. Thus produced adenine-requiring mutant strains of *Micrococcus glutamicus* are useful in the present invention. It is also possible to utilize such strains as require both adenine and other nutrients simultaneously for their growth.

In fact, there is a case which shows the same or more accumulation of inosinic acid in comparison with the case of adenine-requiring strain, as shown in Example 2, by using such strain as requiring both adenine and methionine for its growth.

The present inventors could obtain various kinds of such nutrient-requiring strains by subjecting strains of *Micrococcus glutamicus* [this is a glutamic acid producing species having such characteristics as described in U.S. Patent application Serial No. 771,732 filed November 4, 1958, now U.S. Patent 2,979,439 (April 11, 1961)] to ultraviolet ray and $\gamma$-ray treatments. Seven strains described in this specification were obtained by the treatment described above. Some characteristics of said strains were shown in Table 1 of said U.S. patent. A living culture of each mutant, that is *Micrococcus glutamicus* KY5101, *M. glutamicus* KY5201, *M. glutamicus* KY9304, *M. glutamicus* KY9781, *M. glutamicus* KY9884, *M. glutamicus* KY9887 and *M. glutamicus* KY9934, has been deposited with American Type Culture Collection in Washington, D.C. Said cultures have been given the designations ATCC No. 14305, ATCC No. 14306, ATCC No. 14995, ATCC No. 14996, ATCC No. 14997, ATCC No. 14998 and ATCC No. 14999 respectively.

The exact mechanism of accumulation of inosinic acid with adenine-requiring strains is not known up to this time. However, as inosinic acid is found to be the precursor of adenine biosynthesis in many organisms (see Buchanan et al., Advances in Enzymology, vol. 21, page 199, 1959) the accumulation of inosinic acid by adenine-requiring strain may be understandable in a way. An adenine-requiring strain of *Micrococcus glutamicus* can accumulate a lot of L-glutamic acid as well as inosinic acid, and this fact emphasizes the usefulness of adenine-requiring strain of this species.

As for the culture medium to be used in the present invention, it may be possible to employ either synthetic medium or natural material containing medium whenever they contain a proper amount of carbon source such as saccharide as shown in examples and the like, nitrogen source, inorganic material and other nutrients. As to the carbon source and nitrogen source to be used in the said medium, various kinds of material utilizable for the employed microorganism may successfully be utilized.

That is, as carbon source, such various carbohydrates as glucose, glycerol, fructose, sucrose, maltose, mannitol, xylose, galactose, lactose, ribose, starch, starch hydrolyzate solution, molasses and the like may be utilized and the concentration thereof may normally be about 1–20% (calculated as glucose) of the culture medium. Furthermore, various organic acids, such as gluconic acid, pyruvic acid, lactic acid, acetic acid and the like; various amino acids, such as glycine, glutamic acid, alanine and the like; and organic material, such as glutamine, may be successfully utilized.

As nitrogen source, it may be possible to employ ammonia; various inorganic and organic ammonium salts, such as ammonium chloride, ammonium phosphate, ammonium sulfate, ammonium nitrate, ammonium carbonate, ammonium acetate, and the like; nitrogenous organic material, such as urea, peptone, NZ amine (trypsin-hydrolyzed casein), meat extract, yeast extract, corn-steep-liquor, casein hydrolyzate, fishmeal or its digested products, soybean meal or its digested products, pupa hydrolyzate and the like; and amino acid, such as glycine, glutamic acid, alanine and the like. When a synthetic raw material, such as urea and ammonium salt, is employed and when a material having a lower content of adenine is employed as nitrogen source, it is necessary to employ herewith adenine, an adenine derivative, such as adenosine, or a material containing one of these, for examples yeast extract, yeast hydrolysate, fish soluble and hydrolysate of microorganism cells, so as to maintain a concentration of from 2–80 $\mu$g./m. of adenine in the initial culture medium. As to the total amount of adenine to be found in the culture medium, it is preferable to be the said concentration of available adenine and in case of excess amounts of adenine the accumulation of inosinic acid decreases remarkably in spite of good growth of the microorganisms. Thus, it is an important factor for the fermentation of the present invention that the fermentation is carried out by limiting adenine concentration to the level of less than the suitable amounts for the growth of the said microorganism. As to an inorganic material, such compounds as potassium monohydrogen phosphate, potassium dihydrogen phosphate, magnesium sulfate, calcium carbonate and the like may successfully be used.

If the microorganism requires both adenine and other nutrients, the material which satisfies the growth requirement should of course be added to the culture medium.

The fermentation is carried out under an aerobic condition, such as shaken culture and aerated and stirred submerged culture. The cultivation temperature is from 20 to 40° C. It is extremely important for the fermentation of the present invention to control the pH of the culture medium during cultivation. That is, when the fermentation begins, the pH of the culture medium is apt to vary with the progress of the said fermentation, and so it is preferable to control the pH of the culture medium at around 6.0 e.g. between 5 and 8, by adding proper neutralizing agent during cultivation to obtain a higher yield. As for the neutralizing agent, it may be possible to employ such material as ammonia water, sodium hydroxide, ammonium carbonate, calcium carbonate and the like. Further, it may be possible to employ urea if the urease is possessed by the microorganism to be utilized. The period of cultivation is generally from 2 to 6 days with bacteria and from 4 to 10 days with fungi and actinomycetes, and sufficient amounts of inosinic acid are produced and accumulated in the culture medium and the cells during these periods of cultivation.

After the cultivation is over, the cells are removed and inosinic acid is recovered from the culture medium by using ion exchange resin treatment as shown in Example 1. Using other known methods such as ion-exchange resin treatment, absorption method, precipitation method, and extraction method, inosinic acid may also be recovered from the broth.

The present invention will more fully be explained with respect to the examples, which are provided merely by way of illustration and not by way of limitation. In fact, it may be possible to employ various modified methods without deviation from the extent and spirits of the present invention.

*Example 1*

*Micrococcus glutamicus* No. 5101; ATCC No. 14305 was cultured at 28° C. for 24 hours in a culture medium comprising 2% of glucose, 1% of peptone, 0.5% of meat extract, 0.25% of NaCl and 10 μg./l. of biotin and thus obtained seed culture was inoculated onto the fermentation culture medium at the rate of 10 volume percent to the latter medium. Both culture media (30 ml. each) were pored into respective 250 ml. of conical flasks, sterilized and used. The culture medium to be fermented had the following compositions and was subjected to shaking cultivation at 28° C.

20 g. of glucose, 15 g. of $(NH_4)_2SO_4$, 0.5 g. of $KH_2PO_4$, 0.5 g. of $K_2HPO_4$, 0.25 g. of $MgSO_4 \cdot 7H_2O$, 5 mg. of adenine and 1 μg. of biotin were dissolved into water to make the volume of solution to be 1 liter. The pH of the solution was adjusted to 7.4 before sterilization. After sterilization, a sterilized $CaCO_3$ was added thereto at the rate of 10 g. to 1 liter of the said solution.

After 72 hours cultivation, 840 μg./ml. of inosinic acid was accumulated in the said fermentation broth. At the same time, L-glutamic acid was also accumulated therein. Furthermore, the accumulation of inosinic acid was observed in the cells, too. The filtrate (1.2 l.) obtained by removing the cells from the fermentation broth was added with barium hydroxide to adjust the pH at 8.2, and then adjusted to 9.0 by adding sodium hydroxide to remove off the phosphoric acid and other impurities. Thus obtained supernatant was passed through the resin tower of Diaion SA #200 (OH-type), the resin tower which absorbed inosinic acid was washed with water, eluted with a mixed solution of 0.5 N of formic acid and 0.25 N of ammonium formate, the eluate containing inosinic acid were combined together, and thus obtained solution was added with barium hydroxide to precipitate the impurities out. The filtrate was condensed and cooled to obtain a crude crystal of inosinic acid barium salt (yield 1.3 g.). The barium salt could be changed into inosinic acid sodium salt by the treatment with $Na_2SO_4$. This product was identified to be 5'-inosinic acid sodium salt from the various data of elementary analysis, quantitative analysis of base, sugar, ribose and phosphoric acid, oxidation with periodic acid, and ultraviolet absorption curve.

*Example 2*

Adenine- and methionine-requiring strain No. 5201 (ATCC No. 14306) of *Micrococcus glutamicus* was employed and as fermentation medium the following composition was employed. The pH of the culture medium was maintained at about 6 by adding urea solution during the cultivation. Other conditions were all same with that of Example 1. After 96 hours' fermentation, the amount of inosinic acid accumulated in the culture medium was 2.3 mg./ml.

The culture medium utilized in the said fermentation had the following composition:

5% of maltose, 1.5% of $(NH_4)_2SO_4$, 0.1% of $KH_2PO_4$, 0.1% of $K_2HPO_4$, 0.5% of corn-steep-liquor, 0.5% of NZ amine, 15 mg./l. of adenine.

The pH of the said solution was adjusted to 7.4 before sterilization.

*Example 3*

Microorganism employed: *Micrococcus glutamicus* KY9304 (ATCC No. 14995)

| Seed medium: | Percent by weight |
|---|---|
| Glucose | 2 |
| Peptone | 1 |
| Yeast extract | 1 |
| NaCl | 0.3 |
| Water | The balance |
| Fermentation medium: | |
| Glucose | 5 |
| $NH_4Cl$ | 0.4 |
| $K_2HPO_4$ | 0.2 |
| $KH_2PO_4$ | 0.2 |
| $MgSO_4 \cdot 7H_2O$ | 0.2 |
| Yeast extract | 1 |
| $CaCO_3$ | 1.5 |
| Water | The balance |

The above was subjected to shaking cultivation for 5 days at 28° C. and was found to have accumulated 1.21 mg./ml. of 5'-inosinic acid in the medium.

*Example 4*

Microorganism employed: *Micrococcus glutamicus* KY9781 (ATCC No. 14996)

Seed medium: The same as for Example 4.

| Fermentation medium: | Percent by weight |
|---|---|
| Glucose | 10 |
| $NH_4Cl$ | 0.7 |
| $K_2HPO_4$ | 0.2 |
| $KH_2PO_4$ | 0.2 |
| $MgSO_4 \cdot 7H_2O$ | 0.3 |
| Yeast extract | 1.5 |
| $CaCO_3$ | 3 |
| Water | The balance |

After 4 days of shaking cultivation of the above culture medium, at 28° C., 1.18 mg./ml. of 5'-inosinic acid was found accumulated therein.

*Example 5*

Microorganism employed: *Micrococcus glutamicus* KY9883 (ATCC No. 14997)

Seed medium: The same as for Example 4.

| Fermentation medium: | Percent by weight |
|---|---|
| Glucose | 10 |
| $NH_4Cl$ | 1 |
| $K_2HPO_4$ | 0.2 |
| $KH_2PO_4$ | 0.2 |
| $MgSO_4 \cdot 7H_2O$ | 0.03 |
| Yeast extract | 0.75 |
| $CaCO_3$ | 2 |
| Water | The balance |

After shake-culturing the above medium for 4 days at 28° C. 0.48 mg./ml. of 5'-inosinic acid was accumulated therein.

*Example 6*

Microorganism employed: *Micrococcus glutamicus* KY9887 (ATCC No. 14998)

Seed medium, fermentation medium: The same as for Example 6.

After cultivation in the same seed and fermentation media as in Example 6 for 4 days at 28° C., 0.65 mg./ml. of 5'-inosinic acid was accumlated in the medium.

*Example 7*

*Micrococcus glutamicus* KY9934 (ATCC No. 14999) was employed under the same conditions as in Example 7 and 0.30 mg./ml. of 5'-inosinic acid was accumulated in the medium.

What is claimed is:

1. A method for producing inosinic acid which comprises aerobically culturing, at a pH of from 5 to 8 and in a culture medium containing from 2 to 80 micrograms of adenine per milliliter of the medium, a mutant strain of *Micrococcus glutamicus* which requires adenine for its growth and accumulating inosinic acid in the medium.

2. A method of producing inosinic acid which comprises aerobically culturing *Micrococcus glutamicus* No. 5101 (ATCC No. 14305) at a pH of from 5 to 8 and in a culture medium containing from 2 to 80 micrograms of adenine per milliliter of the medium and accumulating inosinic acid in the medium.

3. A method of producing inosinic acid which comprises aerobically culturing *Micrococcus glutamicus* No. 5201 (ATCC No. 14306) at a pH of from 5 to 8 and in a culture medium containing from 2 to 80 micrograms of adenine per milliliter of the medium and accumulating inosinic acid in the medium.

4. A method for producing inosinic acid which comprises (a) aerobically culturing a mutant strain of *Micrococcus glutamicus,* which requires adenine for its growth, at a pH of from 5 to 8 and in a culture medium containing from 2 to 80 micrograms of adenine per milliliter of the medium, the adenine being present as a member selected from the group consisting of adenine, adenosine, yeast extract, yeast hydrolysate, fish soluble and hydrolysate of microorganism cells, and (b) accumulating inosinic acid in the medium.

5. A method of producing inosinic acid which comprises aerobically culturing *Micrococcus glutamicus* No. KY9304 (ATCC No. 14995) at a pH of from 5 to 8 and in a culture medium containing from 2 to 80 micrograms of adenine per milliliter of the medium and accumulating inosinic acid in the medium.

6. A method of producing inosinic acid which comprises aerobically culturing *Micrococcus glutamicus* No. KY9781 (ATCC No. 14996) at a pH of from 5 to 8 and in a culture medium containing from 2 to 80 micrograms of adenine per milliliter of the medium and accumulating inosinic acid in the medium.

7. A method of producing inosinic acid which comprises aerobically culturing *Micrococcus glutamicus* No. KY9883 (ATCC No. 14997) at a pH of from 5 to 8 and in a culture medium containing from 2 to 80 micrograms of adenine per milliliter of the medium and accumulating inosinic acid in the medium.

8. A method of producing inosinic acid which comprises aerobically culturing *Micrococcus glutamicus* No. KY9887 (ATCC No. 14998) at a pH of from 5 to 8 and in a culture medium containing from 2 to 80 micrograms of adenine per milliliter of the medium and accumulating inosinic acid in the medium.

9. A method of producing inosinic acid which comprises aerobically culturing *Micrococcus glutamicus* No. KY9934 (ATCC No. 14999) at a pH of from 5 to 8 and in a culture medium containing from 2 to 80 micrograms of adenine per milliliter of the medium and accumulating inosinic acid in the medium.

References Cited by the Examiner

UNITED STATES PATENTS 3,118,820 1/1964 Uchida et al. ---------- 195—28
3,152,966 10/1964 Kinoshita et al. ------- 195—28

A. LOUIS MONACELL, *Primary Examiner.*

A. E. TANENHOLTZ, *Assistant Examiner.*